United States Patent [19]

Smith et al.

[11] Patent Number: 4,592,161

[45] Date of Patent: Jun. 3, 1986

[54] SOFT PLASTIC FISHING LURE

[76] Inventors: H. Wayne Smith, 5050 Charlemagne La., Jacksonville, Fla. 32210; Mark W. Smith, 3339 Waverly Dock Rd., Mandarin, Fla. 32064; James O. Ising, 2594 Franklin Ct., Orange Park, Fla. 32073

[21] Appl. No.: 637,980

[22] Filed: Aug. 6, 1984

[51] Int. Cl.$^4$ .............................................. A01K 85/00
[52] U.S. Cl. ....................................................... 43/42.24
[58] Field of Search .......................... 43/42.24, 42.15; D22/27

[56] References Cited

U.S. PATENT DOCUMENTS

| | | | |
|---|---|---|---|
| 1,701,528 | 2/1929 | Clewell | 43/42.36 |
| 2,690,026 | 9/1954 | King | 43/42.24 |
| 3,349,513 | 10/1967 | Jeff | 43/42.24 |
| 4,045,903 | 9/1977 | Parker | 43/42.09 |
| 4,047,318 | 9/1977 | Mapp | 43/42.24 |
| 4,138,792 | 2/1979 | Hill | 43/42.24 |
| 4,316,343 | 2/1982 | Creme | 43/42.24 |

Primary Examiner—Gene P. Crosby
Attorney, Agent, or Firm—Duckworth, Allen, Dyer & Pettis

[57] ABSTRACT

A soft plastic fishing lure is comprised of a generally tubular body of pliable plastic defining forward and rearward ends. A soft plastic tail extends from the rearward end as a substantially flat ribbon, the tail formed of a curved, generally "S" configuration defined by first and second pairs of concentric arcs, with the first arc pair spaced from the body and the second arc pair spaced from the first pair. The shorter arc in each pair extends straight during movement through water, and the longer arc in each pair curls against the flow of water to create turbulence, with the second arc pair causing drag to reduce spin.

13 Claims, 4 Drawing Figures

SOFT PLASTIC FISHING LURE

BACKGROUND OF THE INVENTION

1. Field of the Invention

The present invention relates generally to fishing lures, and more specifically to a well-known class of fishing lures formed of a soft, pliable plastic material having a wormlike appearance.

2. Description of the Prior Art

There has been available for sports bass fishing for years a class of artifical lures known as "plastic worms." These lures are usually fabricated from a soft, pliable plastic material in the shape of a worm, with the hook being extended through the plastic in any one of a number of rigging configurations.

A number of different design features have been adapted for use with plastic worms for bass fishing over the years. In one example, the plastic worm forms a generally cylindrical body tapering to a small, flat tail forming a "paddle" at the rearward extremity of the worm.

A second design feature, commonly referred to as the "curly tail" consists of a generally flat ribbon tail occupying a small portion of the rearward extremity of the worm, and forming a single "hook" at the rearward extremity of the plastic worm. Examples of "curly tail" plastic worms are disclosed in U.S. Pat. Nos. Des. 237,274; Des. 241,346; Des. 241,347; Des. 242,347; Des. 242,348; Des. 243,175; Des. 243,176; and Des. 249,536.

Through extensive research into bass fishing, it has been determined that fully 95 percent of all strikes occur between the time the plastic worm hits water and the time that the worm arrives at the bottom (or to whatever depth the fisherman permits the lure to descend). This period of time is known as the "drop time." It is therefore desirable that the drop time be as long as possible. Since a larger amount of plastic will cause the worm to be more buoyant, it would initially seem that a plastic worm formed of a cylindrical body which extends with as thick a diameter as possible to the tip end would achieve the longest drop time. However, such worm designs suffer from a lack of movement, or "action" and thus do not adequately attract fish. To this end, the curly tail design does provide some fish-attracting action during the drop time. However, the curly tail worm has a tendency to spin during movement through the water, thus causing the fishing line to become twisted. Further, to obtain a fish-attracting action in many plastic worm designs, it is necessary for the worm to move rather rapidly either during the drop time, or during the retrieve as the worm is being reeled in to the fisherman.

SUMMARY OF THE INVENTION

The present invention contemplates a soft plastic fishing lure which simulates a worm and which permits a high degree of fish-attracting action during the drop time, which provides some fish-attracting action when the worm is motionless in the water and which reduces spin while providing fish-attracting motion during a very slow retrieve to the fisherman. In order to achieve these objectives, there is provided a generally tubular body of pliable plastic defining a forward end toward the desired direction of travel and a rearward end. A soft plastic tail extends from the rearward end of the body as a substantially flat ribbon, with the tail forming a curved, generally "S" configuration in the plane of the flat ribbon. The ribbon thus forms first and second pairs of concentric arcs with one arc in each pair being of a shorter length than the other arc in that pair and with the first arc pair being spaced from the rearward end of the body by a length of the flat ribbon. The second arc pair is spaced from the first arc pair by a length of the ribbon; the ribbon is thus defined by two edges, a first edge extending from the rearward end along the longer arc of the first arc pair and thence along the shorter arc of the second arc pair, and a second edge extending from the rearward end along the shorter arc of the first arc pair and thence along the longer arc of the second arc pair. Both of the edges terminate at the tip end of the tail.

In a preferred embodiment of the present invention, the tip of the tail at the extremity of the "S" configuration extends generally parallel to the axis of the cylindrical body, and away from the rearward end of the body, with the flat ribbon tail comprising about 50 percent of the overall length of the cylindrical body and the tail and with the ribbon of a thickness not greater than about 0.100 inch.

In the preferred embodiment, the tail is defined by two generally parallel flat surfaces, one of the surfaces being rounded at the edges thereof.

Further in accordance with the preferred embodiment of the present invention, the "S" configured ribbon tail extends laterally to one side of the body, with the lure further including a fish hook extending from the body along the side opposite the one side.

The fishing lure of the present invention achieves those objectives recited above. First, the "S" configured ribbon tail adds weight and volume which increases floatation, thus increasing the drop time. Second, both of the pairs of concentric arcs along the ribbon tail cause a turbulence for fish-attracting purposes. This is achieved during movement of a lure through water, because the shorter arc in each pair tends to extend straight, while the longer arc in each pair tends to curl against the flow of water to thereby create turbulence. However, the second arc pair causes drag to thereby reduce spin and to avoid line twisting.

DESCRIPTION OF THE PREFERRED EMBODIMENT

A description of the preferred embodiment of the present invention will now be made with reference to drawing.

Figure 1:
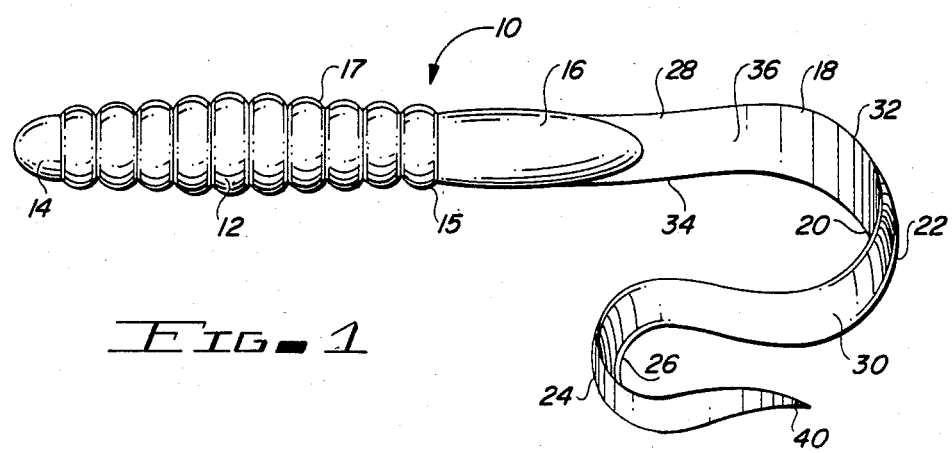
FIG. 1 is a top plan view of a fishing lure in accordance with the present invention, illustrating the lure out of water.

Noting FIG. 1, the fishing lure, referred to generally by the reference numeral 10, includes a generally tubular body of pliable plastic 12 defining a forward end 14 toward the desired direction of travel and a rearward end 16.

In accordance with the present invention, the fishing lure 10 includes a soft plastic tail extending from the rearward end of the body 12 as a substantially flat ribbon, the ribbon being referred to generally by the reference numeral 18 in the drawing. As is shown, the ribbon tail 18 forms a curved, generally "S" configuration in the plane of the flat ribbon 18, and is defined by first and second pairs of concentric arcs, the first arc pair being identified by reference numerals 20 and 22, and the second arc pair by reference numerals 24 and 26. As is seen, one arc 20, 26 in each pair is substantially shorter in length than the other arc 22, 24 in the corresponding pair. The first arc pair 20, 22 is spaced from the rearward end 16 of the body 12 by a length 28 of the flat ribbon, and the second arc pair 24, 26 is spaced from the first arc pair 20, 22 by a second length 30 of the ribbon 18.

The flat ribbon tail 18 is thus defined by two edges 32 and 34, the first edge 32 extending from the rearward end 16 along the longer arc 22 of the first arc pair and thence along the shorter arc 26 of the second arc pair, with the second edge 34 extending from the rearward end 16 along the shorter arc 20 of the first arc pair and thence along the longer arc 24 of the second arc pair, with both of the edges 32, 34 terminating at a tip end of the tail.

Figure 3:
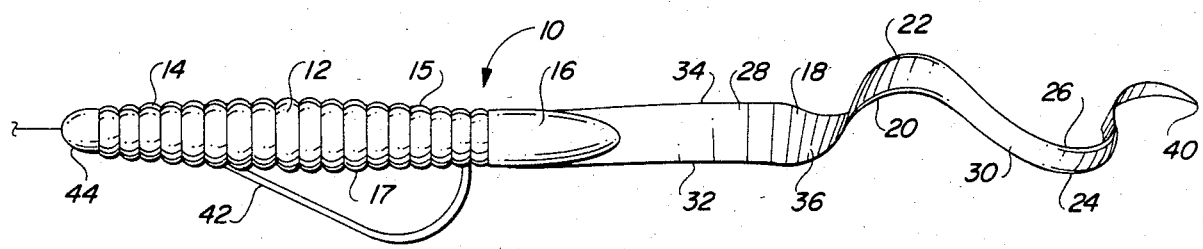
FIG. 3 is a side view illustrating the appearance and action of the lure as it moves through water.
Figure 1:
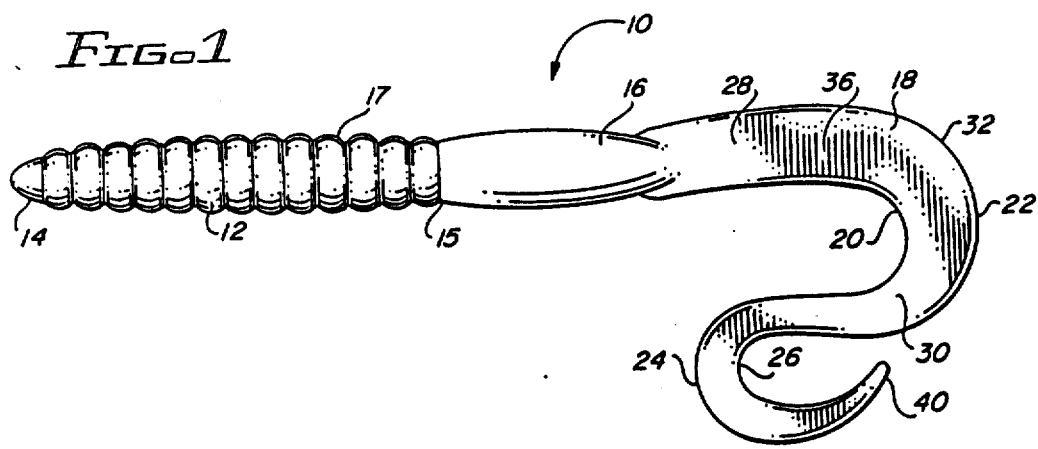
Figure 3:
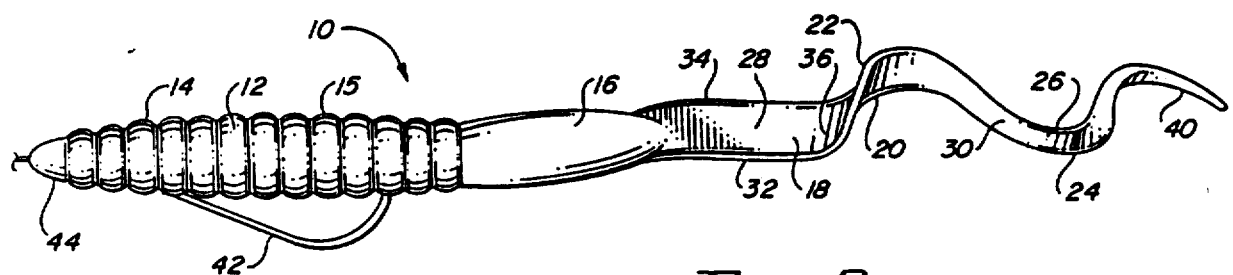

As is shown in FIG. 3, the flat ribbon tail 18 is defined by opposing flat surfaces 36, 38, with one of the surfaces 36 being rounded at the edges 32 and 34.

It will thus be understood that the flat ribbon tail defines the "S" configuration with a first portion extending from the rearward end 16 and generally parallel to the axis of the body portion 12, with a second portion forming a first, approximately 180 degree curve in the flat ribbon (and in the plane of the surfaces 36, 38) curving laterally away from the first portion including the length of flat ribbon 28. The "S" configured ribbon tail further comprises a third portion including the length 30 forming a second, approximately 180 degree curve in the plane of the flat ribbon and curving laterally, initially slightly toward the body 12 and away from the second portion (including length 30), the third portion terminating in the tip 40. As shown in FIG. 1, the tail tapers gradually along the ribbon from at least first pair of arcs 20, 22.

Further in accordance with the present invention, the "S" configured ribbon tail 18 extends laterally away from one side 15 of the body 12. A fish hook 42 which may, for example, be "Texas" rigged, but which in any event extends laterally away from a second side 17 of the body 12, the second side 17 being opposite of the first side 15 for reasons hereinafter explained.

The fishing lure 10 may be further fitted with a weight 44 adjacent to forward end 14.

Figure 2:
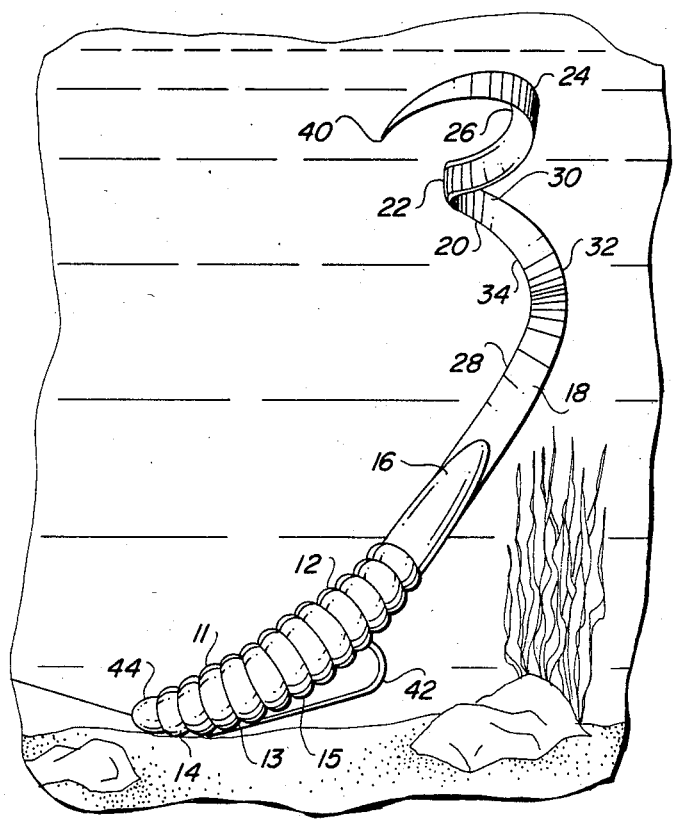
FIG. 2 is a perspective view of the fishing lure of the present invention, illustrating the appearance and action of the fishing lure as it sets motionless on the bottom.
Figure 4:
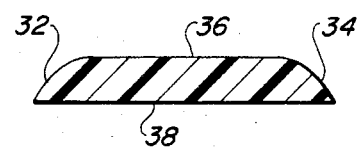
FIG. 4 is a cross-sectional view of the ribbon tail of the fishing lure illustrated in FIGS. 1, 2, and 3.

In use, the fishing lure 10 provides a relatively long drop time, because the ribbon tail adds weight and volume, and because the "S" configuration therein substantially increases turbulence. When the worm is resting on the bottom (note FIG. 2), the rigging of the hook 42 on the side 17 opposite the side 15 from which the "S" configured ribbon tail 18 extends, permits the tail to "flutter" upward from the bottom, thereby increasing the fish-attracting action while the worm remains motionless. During periods when the lure 10 is in motion (see FIG. 3), and particularly during the retrieve phase, the shorter arc 20 and 26 in each arc pair tends to extend straight, while the longer arc 22 and 24 of each arc pair tends to curl against the flow of water, thereby creating fish-attracting turbulence. However, the second arc pair causes drag against rotation of the lure, thereby reducing spin and avoiding line twist.

We claim:

1. A fishing lure comprising:
   (a) a generally cylindrical body of pliable plastic defining a forward end toward the desired direction of travel and a rearward end;
   (b) a soft plastic tail extending from said rearward end of said body as a substantially flat ribbon, said flat ribbon tail molded into a curved, generally "S" configuration in the plane of said flat ribbon, said "S" configuration defined by:
      (1) a first portion extending from said rearward end and generally parallel to the axis of said body portion;
      (2) a second portion forming a first, approximately 180 degree curve in said flat ribbon and curving laterally away from said first portion; and
      (3) a third portion forming a second, approximately 180 degree curve in said flat ribbon and curving laterally away from said second portion, said third portion terminating in the tip of said tail, the curve of said second and third portions having shorter and longer arc pairs, the shorter arc in each pair tends to extend straight during movement of said lure through water and the longer arc in each pair tends to curl against the flow of water to thereby create turbulence, while said second arc pair causes drag to reduce spin.

2. The fishing lure recited in claim 1 wherein the tip of said tail at the extremity of said "S" configuration extends generally parallel to the axis of said cylindrical body, and away from said rearward end of said body.

3. The fishing lure recited in claim 2 wherein said flat ribbon tail comprises about 50 percent of the overall combined length of said cylindrical body and said tail.

4. The fishing lure recited in claim 1 wherein said "S" configured ribbon tail extends laterally to one side of said body.

5. The fishing lure recited in claim 4 further comprising a fish hook extending from said body along a side opposite said one side.

6. The fishing lure recited in claim 1 wherein the thickness of said ribbon tail is not greater than about 0.100 inch.

7. The fishing lure recited in claim 1 wherein said "S" configured ribbon tail is defined by two generally parallel flat surfaces, one of said surfaces being rounded at the edges thereof.

8. A fishing lure comprising:
   (a) a generally cylindrical body of pliable plastic defining a forward end toward the desired direction of travel and a rearward end;
   (b) a soft plastic tail extending from said rearward end of said body as a substantially flat ribbon, said tail forming first and second pairs of concentric arcs with one arc in each pair being of a shorter length than the other arc in that pair and with said first arc pair spaced from said rearward end by a length of said flat ribbon and said second arc pair spaced from said first arc pair by a length of said ribbon; and wherein
   (c) the shorter arc in each pair tends to extend straight during movement of said lure through water and the longer arc in each pair tends to curl against the flow of water to thereby create turbulence, while said second arc pair causes drag to reduce spin; and further wherein (d) said flat ribbon tail is defined by two edges, a first edge extending from said rearward end along the longer arc of said first arc pair and thence along the shorter arc of said second arc pair, and a second edge extending from said rearward end along the shorter arc of said first arc pair and thence along the longer arc of said second arc pair, both of said edges terminating at a tip end of said tail.

9. The fishing lure recited in claim 8 wherein the tip of said tail extends generally parallel to the axis of said cylindrical body, and away from said rearward end of said body.

10. The fishing lure recited in claim 9 wherein said flat ribbon tail comprises about 50 percent of the overall combined length of said cylindrical body and said tail, said tail tapering gradually to said tip end.

11. The fishing lure recited in claim 10 further comprising a fish hook extending from said body along a side opposite said ribbon tail.

12. The fishing lure recited in claim 11 wherein the thickness of said ribbon tail is not greater than about 0.100 inch.

13. A fishing lure comprising:

(a) a generally cylindrical body of pliable plastic defining a forward end toward the desired direction of travel and a rearward end;

(b) a soft plastic tail extending from said rearward end of said body as a substantially flat ribbon of gradually diminishing dimension across said ribbon from said rearward end of said body toward the tip end of said ribbon, said flat ribbon forming first and second pairs of concentric arcs with one arc in each pair being of a shorter length than the other arc in that pair and with said first arc pair spaced from said rearward end by a length of said flat ribbon and said second arc pair spaced from said first arc pair by a length of said ribbon; and wherein (c) the shorter arc in each pair tends to extend straight during movement of said lure through water and the longer arc in each pair tends to curl against the flow of water to thereby create turbulence, while said second arc pair causes drag to reduce spin; and further wherein (d) said flat ribbon tail is defined by two edges, a first edge extending from said rearward end along the longer arc of said first arc pair and thence along the shorter arc of said second arc pair, and a second edge extending from said rearward end along the shorter arc of said first arc pair and thence along the longer arc of said second arc pair, both of said edges terminating at said tip end.

* * * * *

UNITED STATES PATENT AND TRADEMARK OFFICE
CERTIFICATE OF CORRECTION

PATENT NO. : 4,592,161

DATED : June 3, 1986

Page 1 of 2

INVENTOR(S) : H. Wayne Smith et al

It is certified that error appears in the above-identified patent and that said Letters Patent is hereby corrected as shown below:

Figures 1 and 3 should appear as shown on the attached sheet.

Signed and Sealed this

Twenty-fifth Day of November, 1986

*Attest:*

DONALD J. QUIGG

*Attesting Officer*  *Commissioner of Patents and Trademarks*